US008656190B2

(12) United States Patent
Lange et al.

(10) Patent No.: US 8,656,190 B2
(45) Date of Patent: Feb. 18, 2014

(54) ONE TIME SETTABLE TAMPER RESISTANT SOFTWARE REPOSITORY

(75) Inventors: Sebastian Lange, Seattle, WA (US); Adam Gabriel Poulos, Bothell, WA (US); Victor Tan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1308 days.

(21) Appl. No.: 12/023,614

(22) Filed: Jan. 31, 2008

(65) Prior Publication Data
US 2009/0199017 A1 Aug. 6, 2009

(51) Int. Cl.
G06F 11/30 (2006.01)

(52) U.S. Cl.
USPC ......................................................... 713/194

(58) Field of Classification Search
USPC ......................................................... 713/194
See application file for complete search history.

(56) References Cited

U.S. PATENT DOCUMENTS

| | | | |
|---|---|---|---|
| 6,615,330 B2 | 9/2003 | Debiez et al. | |
| 6,625,730 B1 * | 9/2003 | Angelo et al. | 713/2 |
| 7,073,052 B2 | 7/2006 | Brown et al. | |
| 7,155,460 B2 | 12/2006 | McGovern et al. | |
| 7,975,147 B1 * | 7/2011 | Qumei | 713/193 |
| 8,181,021 B2 * | 5/2012 | Ginter et al. | 713/164 |
| 2001/0049794 A1 | 12/2001 | Chen | |
| 2003/0120860 A1 * | 6/2003 | Sun et al. | 711/103 |
| 2004/0083375 A1 * | 4/2004 | Foster et al. | 713/189 |
| 2005/0210041 A1 | 9/2005 | Taguchi | |
| 2006/0010301 A1 | 1/2006 | Yagawa | |
| 2006/0265605 A1 * | 11/2006 | Ramezani | 713/193 |
| 2007/0124611 A1 * | 5/2007 | Johns et al. | 713/300 |
| 2007/0174565 A1 | 7/2007 | Merrick et al. | |

OTHER PUBLICATIONS

ByteandSwitch, "HDS Expands Software, Services", www.byteandswitch.com-document.asp?doc_id=42513, posted on Oct. 27, 2003, 5 pages.
Hitachi Data Systems Corporation, "Hitachi Data Retention Utility", Hitachi Data Systems, Partner Beyond Technology, Jun. 2005, 4 pages.
DevX.com, "Implement Write-Once Read-Many Properties", www.devx.com, posted on Dec. 4, 1999, 2 pages.
"Rewritable Drives Support WORM Archiving Functionality", http:--findarticles.com-p-articles-mi_m0PIL-is_2005_Feb_23-ai_n10020501, Product News Network, posted on Feb. 23, 2005, 3 pages.
"Software Provides Interoperability and Data Management", Product New Network, http:--findarticles.com-p-articles-mi_m0PIL-is_2004_Sept_28-ai_n6211359, posted on Sep. 28, 2004, 3 pages.

* cited by examiner

Primary Examiner — Teshome Hailu
(74) Attorney, Agent, or Firm — Judy Yee; Micky Minhas

(57) ABSTRACT

A one-time-settable tamper resistant software repository may be used in any computing system to store system information such as security violations and policies for responding to them. A one-time-settable tamper resistant software repository may be cryptographically signed, encrypted with a per device key and accessible by only the most privileged software executed by a computing device, e.g., hypervisor or operating system kernel. A one-time-settable tamper resistant software repository may be mirrored in RAM for performance. Recordable event fields in a software repository may be one-time-settable without the ability to reset them in a field operation mode whereas they may be resettable in a different mode such as a manufacturing mode. Memory allocated to a one-time-settable tamper resistant software repository may be reset, reclaimed, reassigned, scaled and otherwise flexibly adapted to changing conditions and priorities in the lifespan of a computing device, which may be particularly useful for service-backed consumer devices.

20 Claims, 3 Drawing Sheets

ONE TIME SETTABLE TAMPER RESISTANT SOFTWARE REPOSITORY

TECHNICAL FIELD

The technical field relates generally to computing and, more specifically, to one-time-settable storage of information.

BACKGROUND

Computing systems, such as those that implement security to protect business models, often rely on one time programmable (OTP) ROM (i.e. PROM) to securely store information. Examples of such devices include service-backed consumer devices, e.g., closed computing systems like game consoles, MP3 players, HD DVD players, cell phones, PDAs and cable set top boxes. Information stored in PROM may include the serial number or update history of a computing system, among other information. As with each additional component in hardware, PROM adds costs to the development and production of computing systems. While secure, there are significant problems with OTP fuses or other PROMs. Aside from costs, there are hardware failure rates associated with manufacturing and operation of devices having PROMs. There is also the potential for irreversible error. Such errors may lead to recalls and component replacements because PROMs cannot be reset. There is also a lack of flexibility. PROMs are fixed in number upon manufacture and cannot be reclaimed or redistributed. PROMs are also susceptible to disablement, i.e., physical blocking, by hardware manipulation.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

The present invention provides for a one-time-settable tamper resistant software repository for use in any computing system. Tamper resistant security may be provided, for example, by cryptographically signing the software repository, encrypting it with an individualized per device key and limiting access to the repository to only the highest privilege level code executed by a computing device, e.g. hypervisor or operating system kernel. Recordable event fields in a software repository may be one-time-settable without the ability to reset them in a field operation mode whereas each recordable event field may be resettable in a different mode such as a manufacturing mode. The software repository may store security policies for responding to security violations or policies for other information stored in the software repository. For example, one security policy may be to deny one or more services supported by a computing device. Such policies may be modified over time. The software repository may be mirrored in protected random access memory for performance. Both copies in non-volatile memory and in RAM may be updated for each recordable event, e.g., security violation. This may entail, for example, using the most secure software to update the mirrored copy in RAM and to decrypt, authenticate/verify, update, re-sign, re-encrypt and re-store the software repository stored in non-volatile memory.

There are numerous advantages to one-time-settable software repositories. For example, unlike PROMs, one-time-settable software repositories are flexible. Software repositories, using non-volatile memory, may be reset to cure manufacturing errors as well as for refurbishment and resale. Thus, errors can be overcome without recalls and component replacement. Software repositories may be scaled in size throughout the life of computing devices. Memory available to software repositories may be reclaimed and redistributed. Security issues may be different at initial release than they are a year later after hackers have time to work on a computing device. Software repositories may be adapted to changing security issues and policies for dealing with them. No specialized hardware such as OTP fuses is required, reducing manufacturing costs and hardware failure rates. Software repositories are also not susceptible to disablement by physical blocking. Software repositories may persist security and other information, protect against illegitimate warranty claims and protect against unauthorized manipulation and access to services, among other benefits. An additional advantage of a per device key is that a software vulnerability in the security system may not be mass exploitable on other computing devices, each securing the software repository with a unique key.

BRIEF DESCRIPTION OF THE DRAWINGS

The foregoing summary, as well as the following detailed description, is better understood when read in conjunction with the appended drawings. For the purpose of illustrating a one-time-settable tamper resistant software repository, there is shown in the drawings exemplary constructions thereof; however, a one-time-settable tamper resistant software repository is not limited to the specific methods and instrumentalities disclosed.

DETAILED DESCRIPTION OF ILLUSTRATIVE EMBODIMENTS

Figure 1:
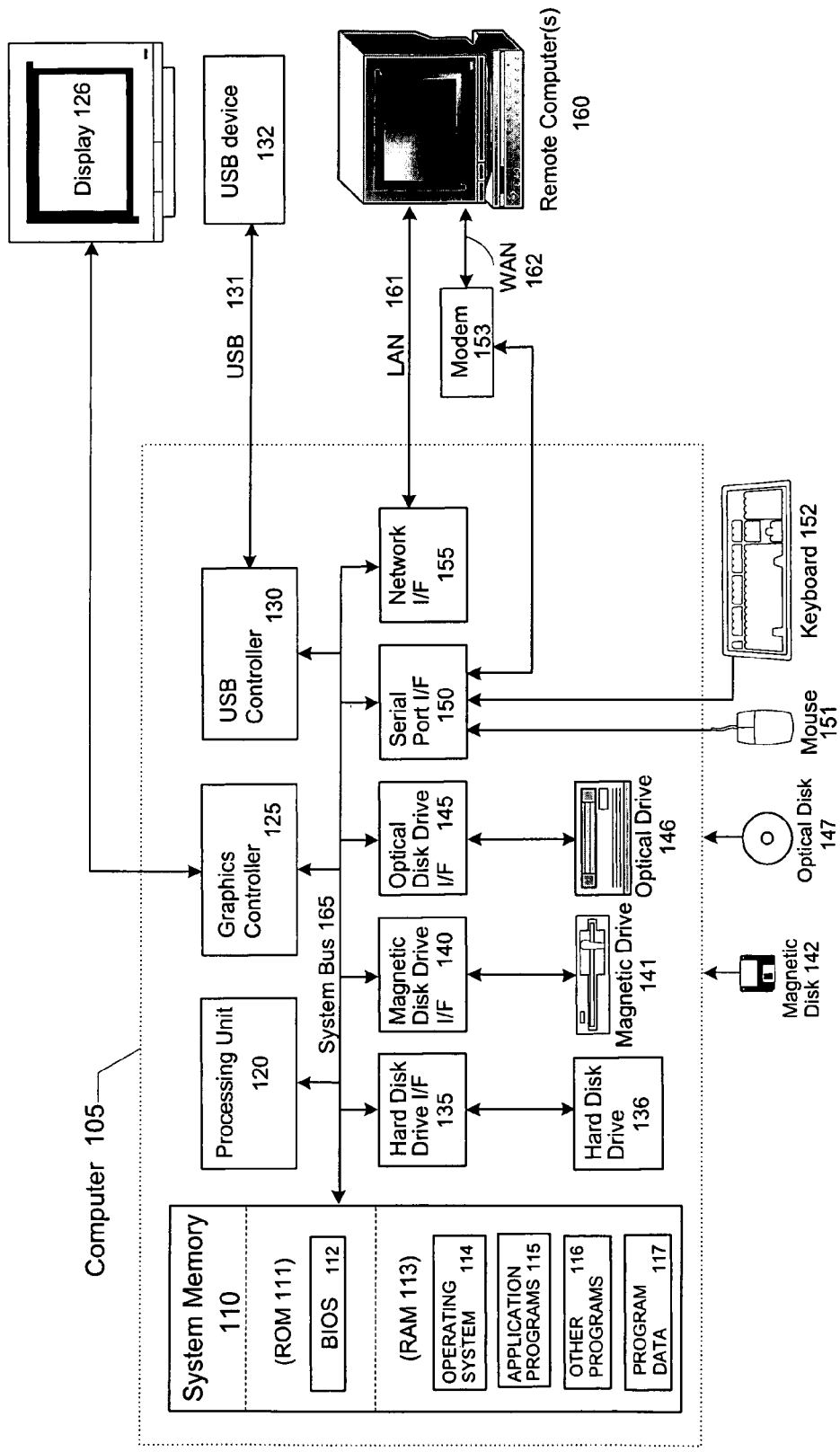
FIG. 1 is a block diagram of an exemplary open computing environment in which various aspects of a one-time-settable tamper resistant software repository can be implemented.

Reference will now be made in detail to embodiments of the present technology for a one-time-settable tamper resistant software repository, examples of which are illustrated in the accompanying drawings. While the technology for a one-time-settable tamper resistant software repository will be described in conjunction with various embodiments, it will be understood that they are not intended to limit the present technology for a one-time-settable tamper resistant software repository to these embodiments. On the contrary, the presented technology for a one-time-settable tamper resistant software repository is intended to cover alternatives, modifications, and equivalents, which may be included within the spirit and the scope of the various embodiments as defined by the appended claims. Furthermore, in the following detailed description, numerous specific details are set forth in order to provide a thorough understanding of the present technology for a one-time-settable tamper resistant software repository. However, the present technology for a one-time-settable tamper resistant software repository may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "opening", "determining", "sequencing", "reading", "loading", "overriding", "writing", "creating", "including", "comparing", "receiving", "providing", "generating", "associating", and "arranging", or the like, refer to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for a one-time-settable tamper resistant software repository is also well suited to the use of other computer systems such as, for example, optical and mechanical computers. Additionally, it should be understood that in embodiments of the present technology for a one-time-settable tamper resistant software repository, one or more of the steps can be performed manually.

The present invention provides for a one-time-settable tamper resistant software repository for use in any computing system. Tamper resistant security may be provided, for example, by cryptographically signing the software repository, encrypting it with an individualized per device key and limiting access to the repository to only the highest privilege level code executed by a computing device, e.g. hypervisor or operating system kernel. Recordable event fields in a software repository may be one-time-settable without the ability to reset them in a field operation mode whereas each recordable event field may be resettable in a different mode such as a manufacturing mode. The software repository may store security policies for responding to security violations or policies for other information stored in the software repository. For example, one security policy may be to deny one or more services supported by a computing device. Such policies may be modified over time. The software repository may be mirrored in protected random access memory for performance. Both copies in non-volatile memory and in RAM may be updated for each recordable event, e.g., security violation. This may entail, for example, using the most secure software to update the mirrored copy in RAM and to decrypt, authenticate/verify, update, re-sign, re-encrypt and re-store the software repository stored in non-volatile memory.

Exemplary Open Computing Environment

FIG. 1 is a block diagram of an exemplary open computing environment in which various aspects of a one-time-settable tamper resistant software repository can be implemented. For purposes of simplicity, not all components or interconnectivity are shown and some components have been merged into other components shown in FIG. 1. Although categorization may vary in degree from one system to the next, open computing environments are general purpose computing environments that may execute virtually any program while closed systems tend to be more specialized with one or more specific purpose(s) designed to execute, perhaps in addition to general programs, privileged programs specifically created for them. Examples of closed systems may include, for example, cable set top boxes, smart phones, gaming consoles and cellular telephones. Although not required, various aspects of a one-time-settable tamper resistant software repository can be described in the general context of computer executable instructions, such as program modules, being executed by a personal computer, client workstation, server or other computing system. Generally, program modules include routines, programs, objects, components, data structures and the like that perform particular tasks or implement particular abstract data types. Moreover, implementation of a one-time-settable tamper resistant software repository can be practiced with other computer system configurations, including hand held devices, multi processor systems, microprocessor based or programmable consumer electronics, network PCs, minicomputers, mainframe computers, and the like. Further, a one-time-settable tamper resistant software repository also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the application programs component (also referred to as the "user component" or "software component"). In various embodiments of a computer system the hardware component may comprise central processing unit (CPU) 120, memory (both ROM 111 and RAM 113), various input/output (I/O) devices such as keyboard 152, mouse 151, display 126, and/or printer (not shown), among other components. To some degree, initialization firmware such as basic input/output system (BIOS) 112 may be considered part of the hardware component as well as part of the hardware/software interface system component. The hardware component comprises the basic physical infrastructure for the computer system.

The application programs component comprises various software programs including but not limited to compilers, database systems, word processors, business programs, video games, and so forth. Application programs provide the means by which computer resources are utilized to solve problems, provide solutions, and process data for various users (machines, other computer systems, and/or end-users).

The hardware/software interface system component comprises (and, in some embodiments, may solely consist of) an operating system that itself comprises, in most cases, a shell and a kernel. As previously noted, firmware such as BIOS may also be considered part of the hardware/software interface system. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. In addition to performing initialization tasks, depending on the system BIOS may also provide some level of interface between hardware and software that isn't performed by the operating system. A purpose of a hardware/software interface system is to provide an environment in which a user can execute application programs.

The hardware/software interface system is generally loaded into a computer system during initialization and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components or their device drivers and/or the BIOS.

As shown in FIG. 1, an exemplary open computing environment in which various aspects of a one-time-settable tamper resistant software repository can be implemented includes a conventional computing device 105 or the like, including processing unit 120, system memory 110, and system bus 165 that couples various system components including system memory 110 to processing unit 120. Processing unit 120 may comprise, for example, a CPU, Northbridge and Southbridge chipset with their well-known functionality, among other components. System bus 165 may be any one or all of several types of bus structures including a memory bus, peripheral bus and a local bus using any of a variety of bus architectures. System memory 110 includes read only memory (ROM) 111 and random access memory (RAM) 113. Basic input/output system (BIOS) 112, containing basic routines that help to transfer information between elements within the computing device 105, such as during initialization, is stored in ROM 111. Among other functionality such as a power on self test or POST as it is commonly known, BIOS 112 may include a computer initialization program such as a boot loader stage to load other initialization stages or load and turn over control to operating system 114. While the only BIOS shown is BIOS 112, some hardware devices such as optical drives may have their own BIOS or other necessary initialization firmware, which may be executed in addition to BIOS 112 during initialization of computing device 105. ROM 111 may include embedded memory, e.g., within the CPU of processing unit 120, and/or one or more discrete non volatile memory devices, including flash memory.

Computing device 105 may further include hard disk drive 136 for reading from and writing thereto operating system 114, application programs 115, other programs 116, program data 117 or other information, magnetic disk drive 141 (e.g. floppy disk drive) for reading from or writing to removable storage 142 or other magnetic disk operating system 114, application programs 115, other programs 116, program data 117 or other information, and optical disk drive 146 for reading from or writing to removable optical disk 147, such as a CD ROM or other optical media, operating system 114, application programs 115, other programs 116, program data 117 or other information. Hard disk drive 136, magnetic disk drive 141, and optical disk drive 146 are connected to system bus 165 by a hard disk drive interface 135, magnetic disk drive interface 140, and optical disk drive interface 145, respectively. The exemplary environment of FIG. 1 also includes universal serial bus (USB) controller 130, USB 131 and USB device 132 (e.g. removable USB flash memory or hard disk drive). USB device 132 is coupled to system bus 165 via universal serial bus 131 and USB controller 130. The drives and their associated computer readable media provide non volatile storage of computer executable instructions, data structures, program modules and other data for computing device 105. Similarly, USB device 132 may also comprise removable non-volatile memory such as a USB flash or hard drive, among a host of other devices. Although the exemplary environment described herein employs hard disk 136, removable magnetic disk 142, removable optical disk 147 and removable USB device 132, it is well-known that a computing system may employ many other types of fixed and removable, volatile and non-volatile computer readable media. Likewise, the exemplary environment may also include many types of monitoring devices such as heat sensors and security or fire alarm systems, and other sources of information.

Data and any number of program modules comprising computer-executable instructions, such as BIOS 112 or other initialization program, operating system 114, application programs 115, other program modules 116 and data such as program data 117, can be stored on any one or more computer-readable mediums such as hard disk drive 136, magnetic disk 142, optical disk 147, ROM 111 (e.g. ROM, EEPROM, flash memories, eFuses), USB device 132, RAM 113 or any other discrete or embedded, volatile or non-volatile memories (not shown). A user may enter commands and information into computing device 105 through input devices such as keyboard 152 and a pointing device such as mouse 151. A wide variety of other input devices (not shown) may include, for example, a microphone, joystick, game pad, tablet or scanner. These and other input devices are often connected to processing unit 120 through a serial port interface 150 that is coupled to system bus 165, but may be connected by other wired or wireless interfaces, such as a parallel port, game port, universal serial bus (USB) or Firewire. Display 126 or other type of display device is also connected to system bus 165 via an interface such as graphics controller 125. In addition to display 126, computing devices typically include other peripheral output devices, such as speakers and printers (not shown).

Computing device 105 may operate in a local and/or wide area network environment using logical connections to one or more remote computers, such as remote computer(s) 160. Remote computer(s) 160 may be another computing device (e.g., personal computer), a server, a router, a network PC, a peer device, or other common network node, and typically includes many or all of the hardware, firmware and software elements described above relative to computing device 105. The logical connections depicted in FIG. 1 include a local area network (LAN) 161 and wide area network (WAN) 162. Such networking environments are commonplace in offices, enterprise wide computer networks, intranets and the Internet. When used in a LAN networking environment, computing device 105 is connected to LAN 161 through network interface 155. When used in a WAN networking environment, computing device 105 can include modem 153 or other means for establishing communications over WAN 162, such as the Internet. While modem 153, which may be internal or external to computer 105, is shown connected to system bus 165 via serial port interface 150, it may be connected in a variety of other ways. In a networked environment, program modules, or portions thereof, may be stored in a remote memory storage device. It will be appreciated that the network connections shown are exemplary and other means of establishing a communications link between computer 105 and remote computer(s) 160 may be employed.

While it is envisioned that numerous embodiments of a one-time-settable tamper resistant software repository are particularly well-suited for computerized systems, nothing in this document is intended to limit a one-time-settable tamper resistant software repository to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

A one-time-settable tamper resistant software repository such as computer device 105 can be implemented in connection with hardware, firmware or software or a combination thereof. Thus, the methods, apparatuses and systems for a one-time-settable tamper resistant software repository, or certain aspects or portions thereof, can take the form of program code (i.e., instructions) and/or data embodied in tangible computer readable media, such discrete or embedded memories such as hard disk drives, magnetic disks, optical disks, USB devices, ROM memories, flash memories, eFuses or any other machine-readable storage medium, wherein, when the program code or data is loaded into and executed or read by a machine, such as computer device 105, the machine becomes an apparatus for implementing a one-time-settable tamper resistant software repository. The program(s) can be implemented in assembly or machine language, if desired. In any case, the language can be a compiled or interpreted language, and combined with hardware implementations. The methods and apparatuses for implementing a one-time-settable tamper resistant software repository also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When executed by a processor, the program code combines with the processor to provide a unique apparatus that operates to invoke the functionality of a one-time-settable tamper resistant software repository. Additionally, any storage techniques used in connection with a one-time-settable tamper resistant software repository can invariably be a combination of hardware, firmware and software.

Exemplary Closed Computing Environment

Figure 2:
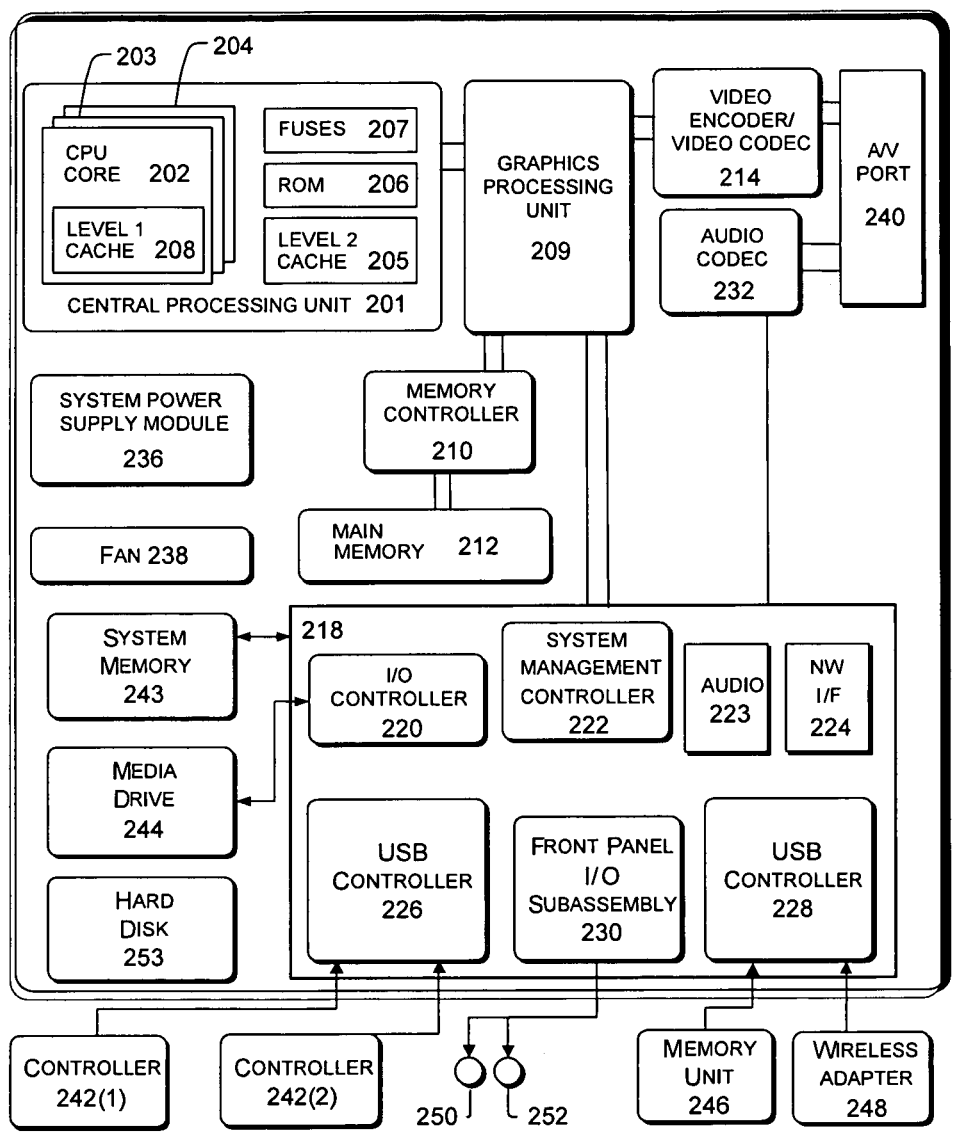
FIG. 2 is a block diagram of an exemplary closed computing environment in which various aspects of a one-time-settable tamper resistant software repository can be implemented.

Without limitation, FIG. 2 is a block diagram of an exemplary closed computing environment in which various aspects of a one-time-settable tamper resistant software repository can be implemented. Closed computing devices tend to be more specialized, or have at least one specialized purpose, relative to general purpose computing devices. Closed systems tend to have one or more specific purpose(s) designed to execute, perhaps in addition to general programs, privileged programs specifically created for them. Examples of closed systems may include, for example, cable set top boxes, smart phones, gaming consoles such as Microsoft's Xbox 360 and cellular telephones that execute one or more privileged programs. As an example of what makes the Xbox 360 a closed computing environment, at least in part, is that it is designed to gain restricted access to services such as Xbox LIVE and Xbox LIVE Marketplace located at http://www.xbox.com. Xbox, Xbox 360 and Xbox Live are registered trademarks of Microsoft Corporation, One Microsoft Way, Redmond, Wash. 98052-6399. Xbox LIVE is a full spectrum online gaming and entertainment service. Besides providing online multiplayer gaming, through Xbox Live and Xbox LIVE Marketplace, customers can download purchased and promotional content to their Xbox 360, including high definition and standard definition television shows, movies, gaming videos, music videos, short feature films, video games, dashboard themes, slideshows, gamer pictures, game trailers/demos, movies, game content such as new maps, weapons, levels, characters, challenges, expansions, arcade games, demos and trailers. Without adequate initialization and other security measures, Xbox 360 gaming consoles may be manipulated for unauthorized use or access.

FIG. 2 is a block diagram of an Xbox 360 gaming console. Game console 200 comprises hardware, firmware and software. Game console 200 executes game applications and plays generic and specialized media files (not shown). For purposes of simplicity, not all components or interconnectivity are shown and some components have been merged in exemplary game console 200. Game console 200 comprises central processing unit (CPU) 201, which has multiple CPU cores 202, 203, 204, each having embedded cache such as level 1 (L1) cache 208. CPU 201 further comprises level 2 (L2) cache 205, ROM (Read-Only Memory) 206 and fuses 207. CPU cores 202, 203 and 204 may share L2 cache memory 205. Level 1 and Level 2 cache 208, 205 temporarily store executable instructions and/or data, thereby improving processing speed and throughput. ROM 206 may store firmware such as BIOS or other initialization programs and data loaded during an initial phase or stage of a boot process such as when game console 200 is initially powered on. Alternatively, or in addition, the BIOS or other initialization programs and data loaded during one or more initialization phases/stages can be stored in another type of non-volatile memory such as flash (a type of EEPROM) memory, as may be represented by system memory 243, or fuses 207. In some embodiments, fuses 207 may be electronically programmable. In some embodiments, ROM 206, fuses 207, and alternative non-volatile memory storing initialization programs and/or data need not be embedded within CPU 201. However, physically locating memory devices that store initialization programs or data in CPU 201 may offer an added layer of security for such information. Game console 200 may optionally be a multi-processor system. For example, game console 200 may have three processors that are similar or dissimilar to processor 201.

Game console 200 further comprises graphics processing unit (GPU) 209, which is coupled to CPU 201, and any additional processors, by a bus. GPU 208 is also coupled by one or more busses each to memory controller 210, I/O (input/output) hub 218 and video codec (coder/decoder) 214. Memory controller 210 and video codec 214 may form part of GPU 209. GPU 209, in addition to video processing functionality, may comprise functionality commonly referred to as Northbridge. Northbridge functionality generally comprises a high speed memory and video hub having a memory controller and a video controller. In exemplary game console 200, both CPU 201 and I/O hub (Southbridge) 218 access main memory 212 through Northbridge functionality in GPU 209. Memory controller 210 facilitates access to various types of main memory 212, which may be RAM (Random Access Memory) or other variety of memory.

GPU 209 and video codec 214 together form a video processing pipeline for high speed, high resolution graphics processing required by many game applications. Data is carried from GPU 209 to/from video codec 214 via a bi-directional bus. This video processing pipeline outputs data to A/V (audio/video) port 240 for transmission to a television or other video display device (not shown). Game console 200 may have its own integrated display (not shown). Not shown is a digital to analog converter (DAC) that may be coupled between video codec 214 and A/V port 240.

Game console 200 further comprises I/O hub 218, which may comprise, among other functionality, functionality commonly referred to as Southbridge. Southbridge functionality generally performs and controls functions that are relatively slow compared to functions performed and controlled by Northbridge. I/O hub 218 comprises I/O controller 220, system management controller 222, audio processing unit 223, network interface controller 224, USB host controllers 226, 228 and front panel I/O subassembly 230. USB controllers 226, 228 serve as hosts for peripheral controllers 242(1), 242(2), wireless adapter 248, and memory unit 246 (e.g., flash memory, CD/DVD ROM, hard drive, other removable media). Network interface 224 and/or wireless adapter 248 provide access to a network (e.g., LAN, WAN or Internet) and may be any of a wide variety of various wired or wireless interface components including an Ethernet card, modem, Bluetooth module, and the like.

System memory 243 may be volatile and/or non-volatile memory, including flash memory. In some embodiments system memory 243 may store all or a portion of the initialization program and data (e.g. various boot loader stages) and operating system that is loaded during the initialization boot process. In other embodiments, system memory 243 may store application data, game saves and downloads. Media drive 244 may comprise, for example, a DVD/CD drive, hard drive or other fixed or removable media reader and/or writer. Game application data may be read from and/or written to media via media drive 244 for execution, playback, etc. by game console 200. Media drive 244 is connected to I/O controller 220 via a bus, such as a Serial ATA bus or other high speed connection. Game console 200 may include hard disk 252, which may be used, for example, to store all or a portion of the initialization program and data (e.g. various boot loader stages) and operating system that is loaded during the initialization boot process, game applications, game data or other types of data.

System management controller 222 provides a variety of service functions for game console 200. Audio processing unit 223 and audio codec 232 form a corresponding audio processing pipeline that may provide high fidelity, 5D, surround, and stereo audio processing of sounds produced by, for example, a game application. Audio data is carried between audio processing unit 223 and audio codec 232 via a communication link. The audio processing pipeline outputs audio data to A/V port 240 for implementation by a device having audio capabilities.

Front panel I/O subassembly 230 supports the functionality of various controls such as power button 250 and eject button 252, as well as any LEDs (light emitting diodes) or other indicators exposed on the outer surface of game console 200. System power supply module 236 provides power to components of game console 200 while fan 238 cools them.

CPU 201, GPU 209, memory controller 210, and various other components within game console 200 are interconnected via one or more buses, including serial and parallel buses, a memory bus, a peripheral bus, and a processor or local bus using any of a variety of bus architectures. As previously noted, not all buses or other connections and components are shown in FIG. 2.

When game console 200 is powered on or rebooted, aside from initialization, application data and/or instructions can be loaded from system memory 243, media drive 244, hard disc 253 or other memory into main memory 212 and/or caches 205, 208 and executed on CPU 201. The game application being executed may present a graphical user interface that provides a consistent user experience when navigating to different media types available on or to game console 200. Instructions and/or data accessible via media drive 244, system memory 243, hard disk 253 or other memory may be launched, played or otherwise accessed from these various sources to provide additional functionality to game console 200.

Game console 200 may be operated as a stand alone system by connecting the system to a television or other display. As previously noted, game console 200 may have an integrated display. In this stand alone mode, game console 200 may allow one or more users to interact with the system, watch movies, listen to music, play games and the like. Network interface 224 or wireless adapter 248 may allow game console 200 to be operated as a participant in a local or wide area network community such as Xbox LIVE.

Figure 3:
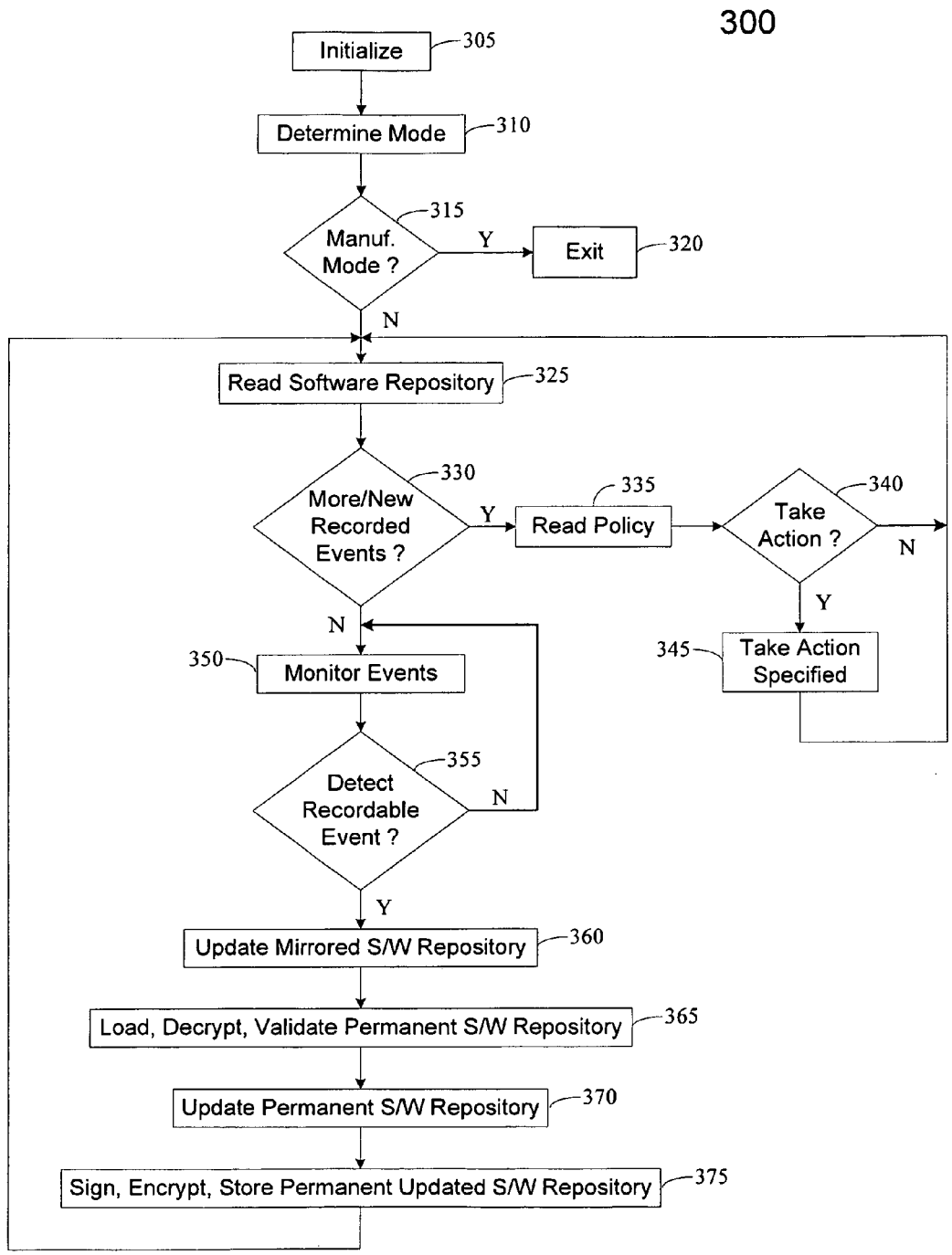
FIG. 3 is a flow diagram illustrating various aspects of a one-time-settable tamper resistant software repository in accordance with one embodiment thereof.

An exemplary embodiment of a one-time-settable tamper resistant software repository will be now be discussed with respect to FIG. 3. Although the embodiment refers to exemplary game console 200, the embodiment and a wide variety of other embodiments have applicability to exemplary computing system 100, exemplary game console 200 and other computing environments.

FIG. 3 is a flow diagram illustrating various aspects of a one-time-settable tamper resistant software repository in accordance with one embodiment thereof. Exemplary method 300 for maintaining a one-time-settable tamper resistant software repository in a computing device comprises, for example, steps 305 to 375 as shown in FIG. 3. Exemplary method 300 has been simplified for purposes of discussion. Exemplary method 300, as well as many other embodiments, may comprise one or more software programs. A software program may include application software or system software such as firmware, utility, operating system, hypervisor or any other category of computer program comprised of instructions executable by a computing system. In some embodiments such as in Microsoft's Xbox 360, the hypervisor has a higher privilege level than the operating system, which prevents exploitation of software vulnerabilities in the operating system. For example, the hypervisor may perform encryption, decryption, RAM access restriction and other high level security functions. Hypervisor may be invoked by a syscall instruction. Method 300, as well as many other embodiments, may be partitioned into multiple programs executing at the same or different privilege levels. Multiple programs, whether at the same or different levels may be linked by application programming interfaces (APIs) or other program to program interface.

Method 300 begins with step 305 initialization. Initialization 305 comprises, for example, an initialization program for an Xbox 360 game console. An exemplary initialization program may comprise a whole or a segmented, partitioned or staged initialization program. For purposes of discussion, it will be assumed that the initialization program is a multi-stage initialization program with reference to game console 200 in FIG. 2. Upon initialization, CPU 201 may be designed to execute its first instructions stored in ROM 206. The first stage of initialization stored in ROM 206 may comprise, for example, a first boot loader stage referred to as 1BL. Since ROM 206 is generally limited in size, first stage 1BL is designed to, among other things, access a second, larger boot loader stage (2BL) in larger flash memory, e.g., system memory 243. Generally, a primary function of various stages of initialization, such as stage 1BL on ROM 206 and various stages 2BL, 4BL, 5BL, 6BL and 7BL on system memory 243, is to load an operating system and, in some embodiments a hypervisor, for the computing device and any patches to them before turning control of game console 200 over to the patched operating system and, in some embodiments, hypervisor.

The presence and number of stages in the initialization program may vary from one embodiment to the next, perhaps in accordance with design (e.g. the presence of ROM and fuses in the CPU and larger flash memory external to the CPU) and/or security measures. The initialization program may be protected or unprotected. For example, one or more security measures such as global or secret constant may be embedded in one or more stages of an initialization program common to the plurality of computing devices. As another example of security measures, each stage may be protected by one or more previous stages in the initialization program. In some embodiments, each stage may be independently encrypted to conceal it, independently signed to validate authenticity or integrity of each stage, or otherwise commonly protected against tampering. Multiple common cryptographic techniques may be employed together to protect the same information. Each key may be a symmetric single secret key as in the case of DES or an asymmetric public key as in the case of RSA. Encryption may be single or multiple (e.g. triple DES). For example, a public key pair may be used to encrypt a secret key used to encrypt a stage. Thus, each stage of an initialization program may be independently encrypted with the key(s) embedded in a preceding stage or elsewhere, as in a key vault.

Further security measures may include, for example, protecting each stage of initialization with a cryptographic hash value generated by an algorithm such as SHA-1 or a keyed-hash message authentication code (HMAC) such as HMAC-SHA-1 to verify the integrity of the information in each stage. While the message and the signature accompanying it are located in the stage to be authenticated/validated, the key, e.g. public key, to analyze the message and signature may be stored in a preceeding stage or elsewhere, e.g., ROM 206, fuses 207. An initialization program may be "rolled up" in storage protected by multiple security measures and, upon initialization, "unrolled" by successfully traversing the various security measures. Various stages in an initialization program may also utilize other security measures such as using memory, e.g., RAM (not shown), ROM 206, fuses 207, in the CPU 201 or segregating RAM, e.g. main memory 212, for sensitive information or operations. Various stages may also be encoded, compressed or otherwise manipulated. In addition to all other manner of security measures, an individualized per computing device key may be used to decrypt, authenticate and/or verify one or more stages of initialization. Some embodiments may also comprise a digital rights management system such as Trusted Computing technology promulgated by the Trusted Computing Group. Game console 200 may, for example, comprise a Trust Computing Module (TPM) (not shown in FIG. 2). In some embodiments, a digital rights management system may also influence initialization.

The per device key may be generated, for example, by seeding a pseudo-random number generator (PRNG) with a truly, i.e. non-deterministic, random number to generate a random per device secret, e.g., key, for use in individualizing one or more stages of a common initialization program among other potential uses. A number bearing relation to CPU 201 such as a CPUID may be used, for example, if it is truly random, if it is combined with a truly random seed, and if it is a well-secured secret within the device (e.g., known only to high-privilege level software). In this way, it may be assured with great probability that an individualized per device secret is generated for each computing device. In some embodiments, the individualized per device secret may comprise an asymmetric public/private key pair. However, in this embodiment the per device key is presumed to be a random symmetric key. Again, this per device secret, e.g., key, may accompany many other secret and public keys in various layers of security. Further, multiple per device secrets may be generated for each device. For example, none to all of the preceding security measures discussed with respect to the common initialization program may be substituted or supplemented with individualized per device secrets. For example, each stage of the initialization program may be encrypted and/or signed with an individualized per device private key retained by the manufacturer. In such embodiments, the individualized per device public key may be stored in non-volatile memory such as in a stage preceding the stage requiring the key to decrypt the stage, authenticate its signature and/or validate its contents.

The individualized per device secret may be stored in the computing device, for example, in non-volatile memory in game console 200. Non-volatile memory includes, ROM 206, fuses 207, system memory 243 (e.g. flash), hard disk 253, etc. One or more of the per device secrets may be embedded in the initialization program or stored independently unsecured or secured, for example by encryption or signature. For example, in some embodiments a per device secret key may be stored in fuses 207, a global or constant key may be stored in ROM 206 and a random key may be stored in each stage for use in decrypting, authenticating and verifying a subsequent stage.

A per device secret may be applied to at least a portion of the initialization program to generate a per device individualized initialization program. For example, a per device key may be used to encrypt at least a portion (e.g. at least one stage) of the common initialization program, which may include instructions and/or data, so that the initialization program is individualized for each computing device such as game console 200. Alternatively, or additionally, one or more per device secrets may be applied to encrypt all stages of the common initialization program. In some embodiments, one per device key may be used, perhaps in conjunction with other per device, constant or random keys to encrypt and/or sign each stage of the common initialization program. The per device secret key may be applied alone or in combination with other keys (per device secrets, random public keys, constant keys, etc.) to encrypt and/or sign one to more stages of common initialization program. In this way, the initialization of a computing device is tied back to one or more unique device identifiers (i.e. per device secrets). Of course the one or more per device secrets may be used for other purposes in addition to initialization. For example, the one or more per device secrets may be used to encrypt and/or sign all media files, programs or other input information, including games input to the computing device, e.g., by downloading, so that the input information may only be accessed (e.g. played or executed) by the computing device. In this way, unauthorized sharing may be prevented.

A per device initialization program may be stored in the non-volatile memory of the computing device. For example, a per device initialization program (including programs and data) may be stored in whole or in part (e.g. stages) in non-volatile memory such as ROM 206, fuses 207, system memory 243 (e.g. flash), hard disk 253, etc. The physical security offered by storage in ROM 206 and fuses 207 in CPU 201 may be superior to storage in system memory 243 and hard disk 253. However, the size of non-volatile memory in CPU 201 may generally be insufficient to store an entire per device initialization program. In some embodiments a per device secret may be stored in fuses 207 while a first boot loader stage (e.g. 1BL) of the per device initialization program may be stored in ROM 206, which may contain one or more per device secret, public, random or other keys, and remaining stages may be stored in system memory 243 (e.g. flash memory). The difficulty of engaging in unauthorized manipulation of ROM 206 and fuses 207 greater protects the most physically vulnerable portion of the per device initialization program in flash memory 243. An image of the flash memory from one computing device may not be written to another computing device because it will not initialize unless the image is in accordance with all security measures including those in ROM 206 and fuses 207.

An advantage of having a per device initialization program stored in a computing device is that a vulnerability in one device cannot be exploited en masse on other computing devices by reusing the same modified initialization program. If a hacker finds a software vulnerability in an initialization stage on one computing device and moves to exploit it or distribute it with a mod chip or otherwise as the hack exploitation is limited to one computing device. Since a hacker doesn't know all the per device secrets of all devices he cannot prepare a modified initialization stage or program that would run on all devices. Another advantage is that it makes reverse engineering by comparison more difficult because among two computing devices there are at least two per device secrets, likely among many other security measures.

Thus, in embodiments having an individualized initialization, a per device key may be used in one or more stages of initialization 305. At least one individualized per device secret may be used to unlock the individualized per device initialization program comprises, for example, applying (with reference to embodiments discussed in FIGS. 2 and 3) the per device key stored in fuses 207, perhaps along with other keys to decrypt, authenticate and/or verify the contents of at least one of the stages of the per device initialization program, e.g., 1BL, 2BL, 4BL, 5BL, 6BL and 7BL. The per device secret may be applied alone or in combination with other security measures. For example, a per device key stored in fuses 207, a global or constant public key stored in the 1BL stage in ROM 206 and per stage keys, e.g. per stage keys in each of 1BL, 2BL, 4BL, 5BL and 6BL for use in subsequent stages, may be used in series or combined to decrypt, authenticate and/or verify the contents of various stages of the individualized per device initialization program, the stages of which may comprise instructions and/or data. For example, stage 5BL may comprise an operating system and hypervisor that stage 4BL loads, decrypts, decompresses, authenticates and validates while stage 6BL may comprise patches to the operating system and hypervisor that stage 7BL loads, decrypts, decompresses, authenticates and validates. The existence of stages and their purpose may vary widely among embodiments. Each per device secret may be used repeatedly, as in the case of application to multiple stages of the per device initialization program to "unroll" it. So long as each step of the initialization successfully decrypts, authenticates and/or verifies each stage the initialization will continue. Otherwise, it may stop, perhaps issuing a message to the user or permitting the user to restore the per device initialization program required by the computing device.

In some embodiments, a one-time-settable tamper resistant software repository may be stored in flash memory 243, perhaps as part of an initialization stage stored therein. One or more application programs and/or system programs comprising exemplary method 300 or other embodiments may also be stored in an initialization stage in flash memory 243. Of course in other embodiments the software repository and program(s) to maintain and use it may be stored elsewhere. For instance, in some embodiments they may be stored in ROM 206 and executed within CPU 201 without external bus traffic. During initialization 305, the one or more application and/or system programs may start executing on computing device such as game console 200. During initialization or soon thereafter, the program(s) embodying method 300 or other embodiments may unlock the software repository and, for performance purposes, mirror it in RAM, e.g. RAM (not shown) in CPU 201 or main memory 212. The RAM in which the software repository is mirrored may be protected by an access privilege level, which may be enforced by CPU 201. In some embodiments, unlocking the software repository may comprise decrypting it and/or validating its contents. The software repository may be singly or multiply encrypted by any variety of key, including a per device key. Validating the contents of the software repository may comprise the application of a predetermined hash algorithm such as SHA-1 or keyed hash algorithm such as HMAC-SHA-1 to the decrypted software repository and confirming that the value generated by the algorithm used matches the value stored with the software repository. A keyed hash requires a key as an input. The key may be any variety of key, including a per device key.

In some embodiments, the step following initialization 305 is step 310 determine mode, which determines the current mode of the computing device. In some embodiments, step 310 determine mode may be restricted to a high, or even the highest, privileged program such as the operating system or hypervisor programs. The number of modes in various embodiments may vary widely. However, in embodiments where flexibility is desired, there may be a mode, such as a manufacturing mode, allowing the software repository to be cleared. Some computing devices may have a detectable secret sequence that will place them in a manufacturing or similar mode such as the application of the sequence followed by a reboot or the application of the sequence during initialization. Of course the parameters of such a mode may vary from one embodiment to the next. Other modes may include a field operating mode that maintains the software repository in accordance with controlling software programs. Step 310 determine mode detects the prevailing mode. Step 315 determines whether the prevailing mode is the manufacturing mode or not. If the computing device such as game console 200 is in manufacturing mode then the method 300 proceeds to step 320 exit. Step 320 exits method 300. In some embodiments this may disable all security programs and permit unlimited access to volatile and non-volatile memory in game console 200. If game console 200 is not in manufacturing mode, e.g., it is in field operation mode, then method 300 proceeds to step 325 read software repository.

Steps 325-345 are part of a cycle to take any action specified for recordable events such as security violations recorded in the software repository. In the embodiment shown in FIG. 3, each cycle addresses each recorded event one at a time until all have been addressed and the cycle exits to step 350 monitor recordable events. In other embodiments, steps 325-340 may be combined. For example, a single step may mask fields in the software repository to find recorded events with active policies in one step.

Step 325 read software repository comprises, for example, accessing the copy of the software repository mirrored in main memory 210. In other embodiments, step 325 read software repository may comprise accessing the software repository store in non-volatile memory such as flash 243. In some embodiments, access to the software repository in main memory 210 or flash 243 may be restricted to a high, or even the highest, privileged program such as the operating system or hypervisor programs. In some embodiments, as shown in FIG. 3, the software repository may be reviewed for one-time-settable bits indicating one or more security violations. Recorded security violations may lead to enforcement action depending on a policy associated with each particular security violation. Since the design of the software repository may vary from one embodiment to the next, various examples of the content of the software repository will be presented for purposes of discussion. It is noted that while repository is used in the singular, it encompasses a plurality of repositories.

In some embodiments, the repository may comprise a table of bits arranged in fields. The bits may concern a wide variety of information of interest generally referred to herein as recordable events. Recordable events may pertain to security, advertising or any other type of information. Without limitation, some specific examples of information that may be stored in a repository include: (a) an attempt to play a pirated or other invalid game disc, (b) a modified console, e.g., a swapped DVD player or other component; (c) boot/initialize to invalid state; (d) invalid system file; (e) file corruption, e.g., failed integrity check of non-volatile memory; (f) targeted advertising history, (g) system update history. The format of the data stored in the repository may be Boolean (e.g. true or false), string, integer, etc. or a combination thereof. The repository, or a group of repositories may indicate whether action, if any, should be taken upon the occurrence of a specified recordable event. Thus, the repository may store detection as well as enforcement information. For example, one bit may represent a true or false indication to the query, "is a malicious device connected to the computing device?" while another bit may represent a true or false indication of whether or not the computing device will take action if true. There may be a default action or a further field may indicate what action is to be taken. Other fields may provide dates and times pertaining to events recorded in the repository.

Of course a software repository offers flexibility to adapt to changing conditions. The size and fields of a software repository may be changed through software updates. Interpretation and treatment of recordable events may vary over time. Recordable events themselves may vary over time. Memory allocated to a software repository may be reclaimed and reassigned. As one example of adaptation, consider that a particular security violation is, at first, limited to very few computing devices. As such, the policy may be to take no action. However, if the security violation becomes more common then a software update may enact a policy to take action against the security violation. Further, a security violation may be unknown at the time of initial release of a computing device. Thereafter, one or more security violations may become apparent. Through software updates, a software repository may be modified to monitor and perhaps take action against such newly discovered security violations.

Step 330 more/new recorded events determines whether there are any additional recorded events, including newly recorded events, such as security violations that have not yet been addressed. If there are additional recorded events then method 300 proceeds to step 335 read software repository for policy and if there are no further recorded events then method 300 proceeds to step 350 monitor recorded events. As previously addressed, fields in a software repository may be used to specify one or more policies, e.g., enforcement policies, in response to recorded events. Policies may vary widely from one embodiment to the next, but may include, for example, no response, deny access to one or more services supported by the computing device, refuse to initialize the computing device, etc. Step 335 read software repository for policy accesses the policy associated with a recorded event. Step 340 interprets the policy associated with a recorded event. If the policy is an inactive one such as a no response policy then method 300 returns to step 325 to review other recorded events in the software repository. If the policy is an active one such as deny access to one or more services supported by the computing device then method 300 proceeds to step 345 to take the action specified in the software repository. Taking an action may entail, for example, executing a process dedicated to carrying out the action such as disabling access to an application or data required to provide a service. Once the action specified is taken method 300 returns to step 325 to review other recorded events in the software repository. When it completes all actions associated with recorded events, the cycle comprised of steps 325-345 exits to step 350 to monitor recordable events.

Step 350 monitor events may comprise, for example, a security algorithm that operates during or soon after initialization, perhaps periodically thereafter, or continuously. The security algorithm may run, for example, when a user attempts to log on to an online service or otherwise access a service supported by the computing device. The security algorithm may run on or offline, i.e., when the computing device is not attempting to access a service. Running offline means that results of the security algorithm must be persisted in memory for use by a service provider. A security algorithm may seek to verify that the computing device and associated user seeking to access service are legitimate. Results of the security algorithm may also lead to action being taken by the computing device itself, e.g., in step 345, to deny access to one or more services it supports or other action based on a policy. A security algorithm may query various hardware and software components to provide information. For example, a security algorithm may query whether a malicious or unauthorized device is connected to the computing device. The security algorithm may compare the information provided to information of record such as the serial numbers and other information stored in key vault or other secure location identifying original hardware and software. In some embodiments, a security algorithm monitoring recordable events may be a lesser privileged program that calls an API to a higher, e.g., highest privileged, program such as the operating system or hypervisor programs to access and update the software repository in RAM and ROM. Step 350 proceeds to step 355 detect recordable event.

Step 355 detect recordable event determines whether an event detected in step 350 is a recordable event. Step 355 requires knowledge of the predetermined list of recordable events in the software repository. If an event detected in step 350 does not match any of the recordable events in the software repository then step 355 returns to step 350 to continue to monitor the computing system for a recordable event. If an event detected in step 350 is determined to be a recordable event in step 355 then method 300 proceeds to steps 360-375. In some embodiments, step 355 will be aware if a recordable event has already been recorded in the software repository on a previous occasion. In some embodiments, a software repository may store each occasion that a recordable event is detected. Repetitious events may be stored, for example, in an integer field of a software repository.

Steps 360-375 update the software repository in main memory 212 and system memory 243 to reflect the event detected in step 350 confirmed to be a recordable event in step 355. In some embodiments, steps 360-375 may be carried out by one or more high privilege programs such as an operating system or hypervisor. In embodiments where event detection steps 350 and 355 are carried out by lower privileged processes, step 355 may utilize one or more APIs to call the higher privileged program(s) to carry out steps 360-375. In some embodiments, the code executing steps 360-375 may have no ability to clear detected events. Instead, the code may only be permitted to record events as an added security measure. Code able to clear recorded events may not be available at all or may only be available in, for example, manufacturing mode. In this way, the software repository operates as a one-time-settable repository.

Step 360 update mirrored table comprises, for example, changing one or more fields in the software repository stored in main memory 212 or RAM (not shown) in CPU 201 to record the recordable event. Steps 365-375 update the permanent software repository stored in non-volatile memory such as system memory 243. Step 365 loads, decrypts and validates the permanent software repository similar to step 305 initialization where the permanent software repository was accessed and loaded into (mirrored) in privileged RAM. Step 370 update table, updates the permanent software repository similar to step 360 to reflect the same change made to the mirrored software repository. Step 375 signs, encrypts and stores the updated permanent software repository. The encrypted signed updated software repository may be stored by an in-place overwrite of the encrypted signed original software repository. In embodiments where a per device key is used and it is symmetric the same per device key is used to decrypt the repository in step 365 and encrypt the updated repository in step 375. In embodiments where a per device key is used and it is asymmetric one key is used to decrypt the repository in step 365 and the paired key is used to encrypt the updated repository in step 375. The series of steps 360-375, after updating the mirrored and permanent software repositories, returns to steps 325-345 to read the (mirrored) software repository and take action if the policy for the newly recorded event is an active policy.

In the foregoing embodiment and in other embodiments a software runtime interface, e.g., API(s), is (are) able to call a high privilege level program to affect changes in a mirrored software repository and persist those changes in a permanent software repository. The one-way or one-time-settable function is made possible by providing no ability to reset or clear or call a malicious program to reset or clear the mirrored or permanent software repositories. This may be done with or without modes. Security measures such as permitting access only by the most privileged code, encrypting and cryptographically signing the permanent software repository using a per device key, perhaps in addition to other security measures such as encrypting RAM and/or setting privilege levels for RAM, provide tamper resistance.

There are numerous advantages to one-time-settable software repositories. For example, unlike PROMs, one-time-settable software repositories are flexible. Software repositories, using non-volatile memory, may be reset to cure manufacturing errors as well as for refurbishment and resale. Thus, errors can be overcome without recalls and component replacement. Software repositories may be scaled in size throughout the life of computing devices. Memory available to software repositories may be reclaimed and redistributed. Security issues may be different at initial release than they are a year later after hackers have time to work on a computing device. Software repositories may be adapted to changing security issues and policies for dealing with them. No specialized hardware such as OTP fuses are required, reducing manufacturing costs and hardware failure rates. Software repositories are also not susceptible to disablement by physical blocking. Software repositories may persist security and other information, protect against illegitimate warranty claims and protect against authorized manipulation and access to services, among other benefits. An additional advantage of a per device key is that defects in the security system may not be mass exploitable on other computing devices, each securing the software repository with a unique key.

A one-time-settable tamper resistant software repository has broad applicability to any system that could benefit from protecting information or services against misuse. A one-time-settable tamper resistant software repository not only makes it more difficult to attack systems employing it, but also prevents mass exploitation of successful attacks, which eliminates much of the incentive to attack computing devices in the first place. This damage control security measure could save manufacturers and service providers from costly recalls and lost business due to application, service or media piracy.

While a one-time-settable tamper resistant software repository has been described in connection with the example embodiments of the various figures, it is to be understood that other similar embodiments can be used or modifications and additions can be made to the described embodiments for performing the same functions of a one-time-settable tamper resistant software repository without deviating there from. Therefore, a one-time-settable tamper resistant software repository as described herein should not be limited to any single embodiment, but rather should be construed in breadth and scope in accordance with the appended claims.

What is claimed:

1. A computing device comprising:
 a processor; and
 memory coupled to the processor, the memory comprising executable instructions that when executed by the processor cause the processor to effectuate operations comprising:
  detecting a security violation in a computing device;
  determining whether the computing device is in a field mode of operation or a manufacture mode of operation;
  when the computer device is in the field mode of operation:
   ensuring that access to a cryptographically locked one-time-settable software repository stored in the computing device is exclusively limited to a highest privileged software when the computing device is in the field mode of operation;
   calling the highest privileged software to access the cryptographically locked one-time-settable software repository stored in the computing device;
   unlocking the locked software repository;
   recording information pertaining to the security violation in the unlocked software repository;
   relocking the unlocked software repository; and
   storing the relocked software repository in the computing device, wherein the recorded information pertaining to the security violation cannot be unrecorded; and when the computing device is in the manufacture mode of operation, allowing recorded information pertaining to the security violation to be unrecorded.

2. The computing device in accordance with claim 1, wherein the highest privileged software comprises a hypervisor.

3. The computing device in accordance with claim 1, wherein:
the unlocking comprises decrypting; and
the locking comprises encrypting using an individualized per device key.

4. The computing device in accordance with claim 1, the operations further comprising:
when the computing device is in the manufacture mode of operation, ignoring the detected security violation.

5. The computing device in accordance with claim 1, the operations further comprising:
decrypting the cryptographically locked one-time-settable encrypted software repository with an individualized per device key to generate a signed software repository;
authenticating the signature of the signed software repository;
recording a new recordable event in the signed software repository to generate an updated software repository;
signing the updated software repository to generate a signed updated software repository;
encrypting the signed updated software repository with the individualized per device key to generate an encrypted signed updated software repository; and
storing the encrypted signed updated software repository.

6. The computing device in accordance with claim 5, wherein the information associated with the recordable event comprises detection and enforcement information pertaining to security.

7. The computing device in accordance with claim 6, wherein the detection and enforcement information is modifiable over time in response to a recordable event.

8. The computing device in accordance with claim 1, wherein the stored information includes information pertaining to an attempt to execute pirated software on the computing device.

9. The computing device in accordance with claim 1, wherein the stored information includes information pertaining to an attempt to execute pirated software on the computing device.

10. A method comprising:
identifying one of at least two modes of operation of a computing device, the at least two modes of operation comprising a manufacturing mode of operation and a field mode of operation;
when the computing device is in the manufacturing mode of operation, providing access to a storage element for clearing a one-time-settable encrypted signed software repository; and
when the computing device is in the field mode of operation, restricting access to a one-time-settable encrypted signed software repository to a highest privileged software running on the computing device;
detecting an occurrence of a recordable event;
recording in the one-time-settable encrypted signed software repository, information associated with the recordable event; and
responding to the occurrence of the recordable event in accordance with policy defined in the one-time-settable encrypted signed software repository.

11. The method in accordance with claim 10, wherein the storage element comprises non-volatile memory, the method further comprising:
mirroring the software repository in privileged access volatile memory; and
recording the recordable event in the software repository mirrored in the privileged access volatile memory in addition to recording the recordable event in the one-time-settable encrypted signed software repository stored in the non-volatile memory.

12. The method in accordance with claim 10, further comprising:
decrypting the one-time-settable encrypted signed software repository with an individualized per device key to generate a signed software repository;
authenticating the signature of the signed software repository;
recording a new recordable event in the signed software repository to generate an updated software repository;
signing the updated software repository to generate a signed updated software repository;
encrypting the signed updated software repository with the individualized per device key to generate an encrypted signed updated software repository; and
storing the encrypted signed updated software repository.

13. The method in accordance with claim 12, wherein the recording the new recordable event in the signed software repository is accomplished by a highest privileged software executing on the computing device.

14. The method in accordance with claim 12, wherein authenticating the signature of the signed software repository comprises applying a keyed cryptographic hash function to the software repository using the per device key to generate a calculated hash value and confirming that the calculated hash value matches the signature of the signed software repository.

15. The method in accordance with claim 10, wherein the information associated with the recordable event comprises detection and enforcement information pertaining to security.

16. The method in accordance with claim 15, wherein the detection and enforcement information is modifiable over time in response to a variety of new recordable events.

17. A computer-readable storage medium that is not a transient signal, the computer-readable storage medium comprising computer-executable instructions that when executed by a processor cause the processor to effectuate operations comprising:
detecting a security violation in a computing device;
determining whether the computing device is in a field mode of operation or a manufacture mode of operation;
when the computing device is in the field mode of operation:
ensuring that access to a cryptographically locked one-time-settable software repository stored in the computing device is exclusively limited to a highest privileged software when the computing device is in the field mode of operation;
calling the highest privileged software to access the cryptographically locked one-time-settable software repository stored in the computing device;
unlocking the locked software repository;
recording information pertaining to the security violation in the unlocked software repository;
relocking the unlocked software repository; and
storing the relocked software repository in the computing device, wherein the recorded information pertaining to the security violation cannot be unrecorded; and when the computing device is in the manufacture mode of operation then, allowing the recorded information pertaining to the security violation to be unrecorded.

18. The computer-readable storage medium in accordance with claim 17, wherein:
the unlocking comprises decrypting; and
the locking comprises encrypting using an individualized per device key.

19. The computer-readable storage medium in accordance with claim 17, wherein the highest privileged software comprises a hypervisor.

20. The computer-readable storage medium in accordance with claim 17, the operations further comprising:
when the computing device is in the manufacture mode of operation, ignoring the detected security violation.

* * * * *